(12) United States Patent
Hirata et al.

(10) Patent No.: US 11,216,016 B2
(45) Date of Patent: Jan. 4, 2022

(54) FLOW RATE CONTROL METHOD AND FLOW RATE CONTROL DEVICE

(71) Applicant: FUJIKIN INCORPORATED, Osaka (JP)

(72) Inventors: Kaoru Hirata, Osaka (JP); Shinya Ogawa, Osaka (JP); Katsuyuki Sugita, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 16/972,157

(22) PCT Filed: Jun. 19, 2019

(86) PCT No.: PCT/JP2019/024323
§ 371 (c)(1),
(2) Date: Dec. 4, 2020

(87) PCT Pub. No.: WO2020/004183
PCT Pub. Date: Jan. 2, 2020

(65) Prior Publication Data
US 2021/0240208 A1 Aug. 5, 2021

(30) Foreign Application Priority Data
Jun. 26, 2018 (JP) .............................. JP2018-120719

(51) Int. Cl.
*F16K 31/02* (2006.01)
*G05D 7/06* (2006.01)
(Continued)

(52) U.S. Cl.
CPC .............. *G05D 7/0617* (2013.01); *G01F 1/34* (2013.01); *G01F 15/005* (2013.01); *F16K 31/004* (2013.01)

(58) Field of Classification Search
CPC ....... F16K 31/004; G05D 7/0617; G01F 1/34; G01F 15/005
(Continued)

(56) References Cited

U.S. PATENT DOCUMENTS 8,794,261 B2 * 8/2014 Watanabe ................. F17D 3/00
                                                         137/486
9,058,041 B2 * 6/2015 Lacouture ............ G05D 7/0629
(Continued)

FOREIGN PATENT DOCUMENTS

JP     2007-192269 A    8/2007
JP     4933936 B2       5/2012
(Continued)

OTHER PUBLICATIONS

International Search Report issued in PCT/JP2019/024323; dated Sep. 10, 2019.

*Primary Examiner* — Minh Q Le
(74) *Attorney, Agent, or Firm* — Studebaker & Brackett PC

(57) ABSTRACT

A flow rate control method for raising a flow rate performed in a flow control device having a first control valve, a second control valve downstream of the first control valve, and a pressure sensor for measuring a pressure between the first and the second control valves, comprises a step (a) of determining a pressure remaining downstream of the first control valve in a state of closing the second control valve, and a step (b) of controlling the pressure remaining downstream of the first control valve by adjusting the opening degree of the second control valve based on the output of the pressure sensor to flow the fluid downstream the second control valve at the first flow rate.

15 Claims, 3 Drawing Sheets

(51) Int. Cl.
  *G01F 1/34* (2006.01)
  *G01F 15/00* (2006.01)
  *F16K 31/00* (2006.01)

(58) Field of Classification Search
  USPC ............ 137/487.5; 251/129.01; 156/345.15, 156/345.24, 345.26; 118/715
  See application file for complete search history.

(56) References Cited

U.S. PATENT DOCUMENTS

| | | | | |
|---|---|---|---|---|
| 9,348,339 | B2* | 5/2016 | Ding | C23C 16/45557 |
| 9,507,352 | B2* | 11/2016 | Dohi | F16K 31/52491 |
| 2003/0183279 | A1* | 10/2003 | Chang | G05D 7/0647 |
| | | | | 137/487.5 |
| 2004/0244837 | A1* | 12/2004 | Nawata | G05D 7/0647 |
| | | | | 137/487.5 |
| 2010/0127196 | A1 | 5/2010 | Sawada et al. | |
| 2010/0294964 | A1 | 11/2010 | Matsumoto et al. | |
| 2012/0038277 | A1* | 2/2012 | Eto | H01J 37/32935 |
| | | | | 315/111.21 |
| 2012/0073672 | A1* | 3/2012 | Ding | C23C 16/45523 |
| | | | | 137/14 |
| 2015/0136248 | A1 | 5/2015 | Nagase et al. | |
| 2016/0327963 | A1 | 11/2016 | Hirata et al. | |
| 2018/0172491 | A1* | 6/2018 | Ding | G01F 1/34 |
| 2019/0137309 | A1 | 5/2019 | Sawada et al. | |
| 2019/0178389 | A1 | 6/2019 | Sawada et al. | |
| 2020/0232873 | A1* | 7/2020 | Nagase | G05D 7/0635 |
| 2020/0348704 | A1* | 11/2020 | Sugita | G05D 7/0647 |
| 2021/0041279 | A1* | 2/2021 | Penley | F15D 1/04 |
| 2021/0157341 | A1* | 5/2021 | Hirata | G05D 7/0647 |

FOREIGN PATENT DOCUMENTS

| | | |
|---|---|---|
| JP | 2015-138338 A | 7/2015 |
| WO | 2013/179550 A1 | 12/2013 |
| WO | 2018/008420 A1 | 1/2018 |
| WO | 2018/021277 A1 | 2/2018 |

* cited by examiner (a) SET FLOW RATE (b) CONTROLLED FLOW RATE (c) UPSTREAM PRESSURE (d) 1st VALVE (NC)

(e) 2nd VALVE (NO)

(f) 2nd VALVE (NC)

FLOW RATE CONTROL METHOD AND FLOW RATE CONTROL DEVICE

TECHNICAL FIELD

The present invention relates to a flow rate control method and a flow rate control device, and more particularly, to a flow rate control method and a flow rate control device suitably used in a semiconductor manufacturing equipment, a chemical plant, or the like.

BACKGROUND OF INVENTION

In semiconductor manufacturing equipment and chemical plants, various types of flowmeters and flow rate control devices are utilized to control the flow of fluids such as material gases and etching gases. Among them, the pressure-type flow rate control device is widely used because of its ability to control the flow rate of various fluids with high accuracy by a relatively simple mechanism in which a control valve and a restriction part (for example, an orifice plate) are combined. Further, the pressure-type flow rate control device has an excellent flow rate control characteristic that can perform a stable flow rate control even if the primary-side supply pressure fluctuates greatly. A pressure type flow rate control device is disclosed in, for example, Patent Document 1.

As the control valve of the pressure-type flow rate control device, a piezoelectric element driven valve, in which a metal diaphragm valve element is opened/closed by a piezoelectric element driven device (hereinafter, sometimes referred to as a piezo actuator), is used. Patent Document 2 discloses a normally open type piezoelectric element driven valve used as a control valve.

Pressure-type flow rate control devices are configured to adjust the flow rate by controlling a fluid pressure upstream of the restriction part (hereinafter, sometimes referred to as upstream pressure). The upstream pressure can be controlled by adjusting the opening degree of the control valve provided upstream of the restriction part. By adapting the upstream pressure to a pressure corresponding to a desired flow rate, it is possible to flow the fluid at the desired flow rate.

PRIOR ART LITERATURE

Patent Literature

Patent Document 1: Japanese Laid-Open Patent Publication No. 2007-192269
Patent Document 2: Japanese Patent No. 4933936
Patent Document 3: Japanese Laid-Open Patent Publication No. 2015-138338
Patent Document 4: International Publication No. 2018/021277
Patent Document 5: International Publication No. 2018/008420
Patent Document 6: International Publication No. 2013/179550

SUMMARY OF INVENTION

Problems to be Solved by Invention

In the conventional pressure-type flow rate control device, an on-off valve, whose open/close may be controlled, is provided downstream of an orifice or upstream of the vicinity of the orifice. Such a downstream on-off valve is used, for example, to stop gas supply to a process chamber. Further, when performing the ALD (Atomic Layer Deposition) process using a pressure-type flow rate control device, by repeating the opening/closing operation of the downstream-side on-off valve, a short-period pulse flow rate control may be performed.

However, even after closing the control valve and the downstream-side on-off valve for zero flow rate, an internal pressure of the flow path may increase due to leakage of a fluid through the control valve. Further, depending on the timing of closing the control valve and the downstream-side on-off valve, the pressure of the fluid flowing before closing the valve remains between the valves even after closing the valve, relatively high pressure may remain. As a result, when starting the flow rate control again with the opening of the downstream side on-off valve, the remaining high pressure in the internal flow path is released at once to the downstream, thus the problem so-called overshoot in the rise of the flow rate control may occur.

As a technique for preventing overshoot at the time of rising a flow rate, Patent Document 3 describes an exhaust line provided between the control valve and the orifice to reduce the upstream pressure by exhausting in advance before the flow rate control. However, in the method described in Patent Document 3, it is necessary to separately provide an on-off valve to the exhaust line, and there is a problem that the increase in cost and the size of the device is unavoidable. Further, even if exhausted before the flow rate control, in the feedback control system of the opening of the control valve based on the upstream pressure, it is sometimes difficult to sufficiently improve the responsiveness at the time of the flow rate rise.

The present invention has been made in view of the above-mentioned problems, and its main object is to provide a flow rate control method and a flow rate control device capable of preventing overshoot at the time of flow rate rise and quickly controlling to a set flow rate by improving responsiveness.

Means for Solving Problem

The flow rate control method according to an embodiment of the present invention is a flow rate control method for raising a flow rate from zero to a first flow rate in a flow rate control device including a first control valve provided in a flow path, a second control valve provided downstream of the first control valve, and a pressure sensor for measuring the fluid pressure downstream of the first control valve and upstream of the second control valve, the flow rate control method including a step (a) of determine the pressure remaining downstream of the first control valve based on the output of the pressure sensor (a), in a state of closing the second control valve, and a step (b) of controlling the pressure remaining downstream of the first control valve by adjusting the opening of the second control valve based on the output of the pressure sensor, and flowing the fluid at the first flow rate to the downstream side of the second control valve.

In an embodiment, in the step (a), the remaining pressure is determined with both the first control valve and the second control valve closed.

In an embodiment, the flow rate control method described above further includes a step of opening the first control valve until the pressure remaining downstream of the control valve becomes higher than the pressure corresponding to the first flow rate when the pressure obtained on the basis of the output of the pressure sensor is lower than the pressure corresponding to the first flow rate in the step (a), and closing the first control valve at the time when it exceeds the pressure corresponding to the first flow rate.

In an embodiment, in the step (a), the first control valve is opened to a degree smaller than the opening degree when controlling so as that the opening degree of the first control valve becomes the first flow rate, based on the output of the pressure sensor, when the pressure obtained on the basis of the output from the pressure sensor is equal to or greater than a threshold value, the step (b) is performed after opening the second control valve.

In an embodiment, in the step (b), the opening degree of the second control valve is controlled on the basis of a signal output from the pressure sensor, so as to match a build-down flow rate Q represented by $Q=\alpha \cdot (\Delta P1/\Delta t) \cdot V$ to the first flow rate, where $\alpha$ is the proportional constant, $\Delta P1/\Delta t$ is a pressure change rate of the upstream pressure change $\Delta P1$ from the pressure sensor with respect to the time $\Delta t$ required for the upstream pressure change $\Delta P1$, and V is an internal volume between the first control valve and the second control valve.

In an embodiment, the above flow rate control method further includes a step (c) of flowing a fluid downstream at the first flow rate by controlling the opening degree of the first control valve based on the output from the pressure sensor, at the time point when the output of the pressure center decreases to a predetermined value after performing the step (b).

The flow rate control device according to an embodiment of the present invention includes: a first control valve provided in a flow path, a second control valve provided downstream of the first control valve, and a pressure sensor for measuring fluid pressure downstream of the first control valve and the upstream side of the second control valve, and a control circuit for controlling the operation of the first control valve and the second control valve, wherein the control circuit is configured to control the flow rate by controlling the first control valve and the second control valve based on a signal output by the pressure sensor, when the flow rate starts up from zero to the first flow rate, the control circuit performs a step (a) of obtaining the pressure remaining downstream of the first control valve based on the output from the pressure sensor, in a state where the second control valve is closed, and a step (b) of controlling the pressure remaining downstream of the first control valve by adjusting the opening degree of the second control valve, on the basis of the output of the pressure sensor, and flowing a fluid at a first flow rate to the downstream side of the second control valve.

In an embodiment, the flow rate control device further comprises another pressure sensor provided downstream of the second control valve.

The flow rate control device according to an embodiment of the present invention includes a first control valve provided in a flow path; a second control valve provided downstream of the first control valve; and a pressure sensor for measuring a fluid pressure downstream of the first control valve and upstream of the second control valve, the flow rate control device being configured to control a downstream flow rate on the basis of a signal output from the pressure sensor, wherein when controlling the flow rate from zero flow rate to the first flow rate, from the zero flow rate after closing the second control valve, the opening degree of the second control valve is controlled on the basis of an output of the pressure sensor, so that a rate of a pressure change remaining downstream of the first control valve coincides with a rate of a pressure change when the flow rate of a fluid flowing out from the second control valve becomes the first flow rate. the flow rate flowing out from the second control valve becomes the first flow rate.

In an embodiment, the first control valve is closed when controlling the flow rate from zero flow state to the first flow rate.

In an embodiment, when controlling the flow rate from the zero flow rate state to the first flow rate, the first control valve is controlled to a smaller opening degree than the opening degree corresponding to the first flow rate.

In an embodiment, the opening degree of the second control valve is feedback controlled on the basis of a signal output from the pressure sensor, so that a build-down flow rate Q represented by $Q=\alpha \cdot (\Delta P1/\Delta t) \cdot V$ matches to the first flow rate, where $\alpha$ is a proportional constant, $\Delta P1/\Delta t$ is a pressure change rate of the upstream pressure change $\Delta P1$ from the pressure sensor, with respect to the time $\Delta t$ required for the upstream pressure change $\Delta P1$, V is an internal volume between the first control valve and the second control valve.

In an embodiment, the flow control device further comprises another pressure sensor provided downstream of the secondary control valve.

A flow rate control device according to an embodiment of the present invention comprises a first control valve provided in a flow path, a second control valve provided downstream of the first control valve, and a first pressure sensor for measuring an upstream pressure, which is a fluid pressure downstream of the first control valve and upstream of the second control valve, the flow rate control device is configured to control a downstream flow rate based on a signal output from the first pressure sensor, when controlling the flow rate from a zero flow rate to a first flow rate, the flow rate is controlled by $Q=\alpha \cdot (\Delta P1/\Delta t) \cdot V$ using a pressure remaining downstream of the first control valve, and when the pressure of the first pressure sensor reaches a predetermined pressure, the flow rate is controlled by switching to a control by $Q=K_1 \cdot P1$, where Q is a flow rate, $\alpha$ is a proportional constant, $P1/\Delta t$ is a pressure change rate of the upstream pressure, V is the internal volume between the first control valve and the second control valve, $K_1$ is a constant depending on the temperature of the fluid and the type of fluid, P1 is the upstream pressure output from the first pressure sensor.

In an embodiment, the control is switched when the pressure of the first pressure sensor reaches the pressure corresponding to the first flow rate in the control by $Q=K1 \cdot P1$.

A flow rate control device according to an embodiment of the present invention includes a first control valve provided in a flow path, a second control valve provided downstream of the first control valve, a first pressure sensor for measuring the upstream pressure, that is a fluid pressure downstream of the first control valve and upstream of the second control valve, and a second pressure sensor for measuring a downstream pressure, that is a fluid pressure downstream of the second control valve, the flow rate control device is configured to control the downstream flow rate on the basis of signals output from the first pressure sensor and the second pressure sensor, when controlling the flow rate from zero flow rate to a first flow rate, control the flow rate by $Q=\alpha \cdot (\Delta P1/\Delta t) \cdot V$ using the pressure remaining downstream of the first control valve, at the time when the pressure based on the first pressure sensor and the second pressure sensor reaches a predetermined pressure, switch the control to the control by $Q=K_2 \cdot P2^m (P1-P2)^n$, where Q is the flow rate, a is a proportional constant, $\Delta P1/\Delta t$ is the pressure change rate of the upstream pressure output by the first pressure sensor, V is the internal volume between the first control valve and the second control valve, $K_2$ is a constant depending on the fluid type and the fluid temperature, P1 is the upstream pressure, P2 is the downstream pressure output from the second pressure sensor, m and n are indexes derived from the actual flow rate.

In an embodiment, the control is switched when the pressures of the first and second pressure sensors reach to the pressures corresponding to the first flow rate in the control by $Q=K_2 \cdot P2^m(P1-P2)^n$.

A flow rate control method according to an embodiment of the present invention is a flow rate control method performed when changing the flow rate from zero to a first flow rate that is more than zero, using a flow control device comprising a an opening adjustable first control valve provided in a flow path, an opening adjustable second control valve provided downstream of the first control valve, an opening fixed restriction part provided downstream of the first control valve, and a pressure sensor for measuring a fluid pressure upstream of the second control valve or the restriction part. The method comprises a step (a) of flowing the fluid between the first control valve and the second control valve at the first flow rate to the downstream side of the second control valve, by adjusting the opening degree of the second control valve based on the output of the pressure sensor, from a state where the first control valve and the second control valve are closed, and a step (b) of opening the first control valve after the step (a), at the time when the output of the pressure sensor decreases to a predetermined value, and flowing the fluid at the first flow rate to the downstream side of the restriction part by controlling the opening degree of the first control valve based on the output of the pressure sensor.

In an embodiment, the restriction part and the second control valve are integrally provided to constitute a valve with a built-in orifice.

Effect of Invention

According to the embodiments of the present invention, a flow rate control method and a flow rate control device capable of shortening a flow rate rise time while preventing an overshooting at that time are provided.

DETAILED DESCRIPTION OF INVENTION

Hereinafter, embodiments of the present invention will be described with reference to the accompanying drawings, but the present invention is not limited to the embodiments described below.

Figure 1:
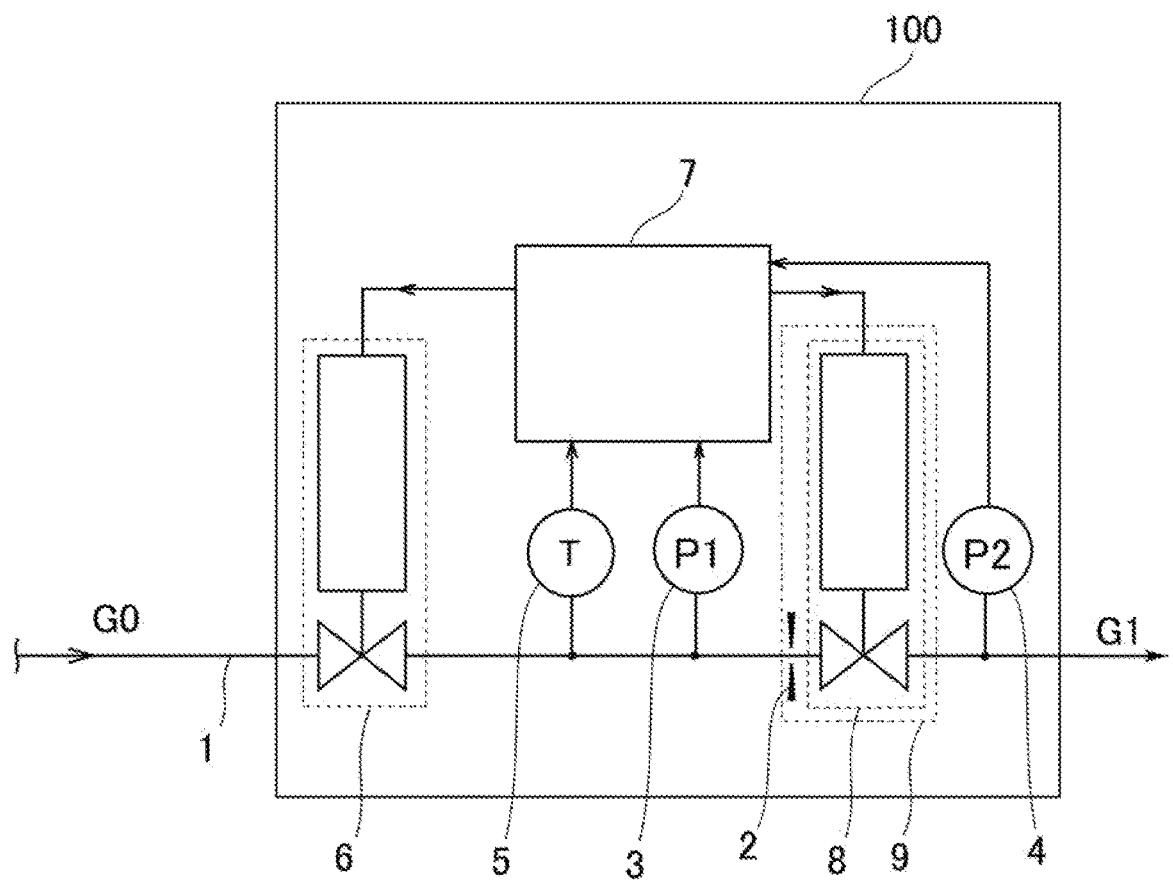
FIG. 1 is a schematic diagram showing a configuration of a flow rate control device according to an embodiment of the present invention.

FIG. 1 shows a configuration of a flow rate control device 100 used for performing the flow rate control method according to an embodiment of the present invention. The flow rate control device 100 includes a first control valve 6 provided in a flow path 1 of a gas G0 connected to a gas supply source (not shown), a restriction part 2 provided downstream of the first control valve 6, a second control valve 8 provided downstream of the first control valve 6 and the restriction part 2, a first or upstream pressure sensor 3 and a temperature sensor 5 for detecting a fluid pressure (upstream pressure P1) and a temperature T between the first control valve 6 and the restriction part 2, respectively.

In addition, the flow rate control device 100 of the present embodiment includes a second or downstream pressure sensor 4 for measuring a downstream pressure of the second control valve 8 (downstream pressure P2). The first pressure sensor 3 can measure the upstream pressure P1, which is the fluid pressure between the first control valve 6 and the restriction part 2, and the second pressure sensor 4 can measure the downstream pressure P2, which is the pressure downstream of the second control valve 8. However, in other embodiments, the flow control device 100 may not include the second pressure sensor 4 and the temperature sensor 5.

In the present embodiment, the restriction part 2 and the second control valve 8 are integrally formed as an orifice built-in valve 9, the restriction part 2 and the valve element of the second control valve 8 are disposed close to each other. In this case, unlike the above-described embodiment, the restriction part 2 may be disposed downstream of the valve element of the second control valve 8. Further, in the case where the restriction part 2 is disposed downstream of the valve element of the second control valve 8, the first pressure sensor 3 measures the upstream pressure P1 that is the fluid pressure between the first control valve 6 and the second control valve 8.

Further, in the case where a restriction part 2 is provided upstream of the second control valve 8 as in the present embodiment, when performing the flow rate control, the upstream pressure P1, which is the fluid pressure between the first control valve 6 and the restriction part 2, is measured. However, when the first control valve 6 and the second control valve 8 are closed, since the upstream side of the restriction part 2 (from the first control valve 6 to the restriction part 2) and the downstream side of the restriction part 2 (from the restriction part 2 to the second control valve 8) have the same pressure, the first pressure sensor 3 measures the fluid pressure between the first control valve 6 and the second control valve 8.

The first pressure sensor 3 may be disposed so as to detect the fluid pressure downstream of the first control valve 6 and upstream of the second control valve 8, and may be configured to measure the fluid pressure between the first control valve 6 and the restriction part 2, or may be configured to measure the fluid pressure between the first control valve 6 and the second control valve 8.

The flow rate control device 100 further includes a control circuit 7 connected to the first control valve 6 and the second control valve 8. The control circuit 7 is configured to control the flow rate by controlling the opening degree of the first control valve 6 based on the signal output from the first pressure sensor 3, and at the same time, to control the opening degree of the second control valve 8 based on the signal output from the first pressure sensor 3, at the time when the flow rate starts-up. In the illustrated embodiment, one control circuit 7 is provided in common for both the first control valve 6 and the second control valve 8, but the present invention is not limited thereto, and it is needless to say that a separate control circuit may be provided for each of the first control valve 6 and the second control valve 8.

The control circuit 7 may be incorporated in the flow control device 100 or may be provided outside the flow control device 100. The control circuit 7 typically includes a processor such as a CPU, a memory such as a ROM or a RAM, an A/D converter, and the like, and may include a computer program configured to execute a flow rate control operation to be described later. The control circuit 7 can be realized by a combination of hardware and software.

The control circuit 7 may be provided with an interface for exchanging information with an external device such as a computer, so that programs and data can be written from the external device to the ROM. All components of the control circuit 7 (such as a CPU) need not be integrally provided in the device, and some components such as the CPU may be disposed in another place (outside the device) and connected to each other by a bus. In this case, the inside of the device and the outside of the device may communicate not only by wire but also wirelessly.

The downstream side of the flow rate control device 100 configured as described above, for example, is connected to a process chamber of a semiconductor manufacturing equipment via a downstream valve (not shown). A vacuum pump is connected to the process chamber, and typically, a gas G1, whose flow rate is controlled, is supplied from the flow rate control device 100 to the process chamber in a state where the inside of the process chamber is evacuated. As the above-mentioned downstream valve, for example, a known air driven valve (Air Operated Valve), whose opening and closing operation is controlled by compressed air, or on-off valve such as a solenoid valve can be used.

In the present embodiment, the restriction part 2 is formed of an orifice plate. Since the orifice plate has an orifice with a fixed cross-sectional area, it functions as a restriction part with a fixed opening degree. Although the orifice aperture may change unintentionally due to clogging or aging of the orifice, in the present specification, the restriction part that is not configured to intentionally control the opening degree will be referred to as the restriction part with a fixed opening degree. Further, in this specification, "restriction part" means a portion where the cross-sectional area of the flow path is limited to be smaller than the cross-sectional area of the front and rear flow path, for example, although it may be configured using an orifice plate or a critical nozzle, a sonic nozzle, a slit structure or the like, it may also be configured using, other things. The diameter of the orifice or nozzle is set to 10 μm to 500 μm, for example.

As the first control valve 6 and the second control valve 8, a valve whose opening degree is adjustable to an arbitrary degree is used, for example, a known piezoelectric element driven valve configured to open/close a metal diaphragm valve element using a piezo actuator is used. The piezoelectric element driven valve can be adjusted to have an arbitrary opening degree by controlling the driving voltage applied to the piezoelectric element.

In the ordinary flow rate control mode of the flow rate control device 100, the opening degree of the first control valve 6 is feedback controlled on the basis of the output from the first pressure sensor 3 so that the upstream pressure P1 output from the first pressure sensor 3 maintains a set value. The first control valve 6 is used as a main valve of the flow control or the main flow rate control valve. As the first control valve 6, a normally closed type valve is used here, but a normally open type valve may also be used.

On the other hand, the second control valve 8 is mainly used at the time of switching a flow rate, such as when rising the flow rate from zero to a low set flow rate, and is used to perform the builddown type flow rate control to be described later. The second control valve 8 is fully open at the time of normal flow rate control other than at the time of switching flow rate, or at least may be maintained at an opening degree having a cross-sectional area larger than the opening area of the restriction part 2. As the second control valve 8, a normally closed type valve may be used, and a normally open type valve may also be used. If using a normally open type valve as the second control valve 8, it is not necessary to apply a driving voltage during periods other than the zero flow rate period and the flow rate rising period, low power consumption can be realized.

In addition, the second control valve 8 can also be used for the flow rate control other than at the time of rising flow rate, it can be used to perform a build-down type flow rate control at the time of flow rate step-down when changing the flow rate from a high set flow rate to a low set flow rate. Such flow rate control method is disclosed in the International Application No. PCT/JP2019/16763 by the applicant of the present application. The flow rate control device 100 according to an embodiment of the present invention is configured to be able to perform the build-down type flow rate control by using the second control valve 8 at the time when the flow rate changes in the flow rate rising or flow rate stepdown periods.

As described above, in the present embodiment, the second control valve 8 and the restriction part 2 are integrally formed to constitute the orifice built-in valve 9. The orifice built-in valve 9 is described in, for example, Patent Document 4, and the orifice built-in valve having the same configuration as that of the conventional art can be used in the present embodiment. In the orifice built-in valve 9, the valve element of the second control valve 8 and the orifice plate as the restriction part 2 are disposed close to each other, and the flow path volume between them is reduced to a degree that may be regarded as substantially zero. Therefore, if using the orifice built-in valve 9, it is possible to improve the characteristics of the rise-up and step-down of the flow rate. In addition, when the orifice built-in valve 9 is used, the internal volume V between the first control valve 6 and the second control valve 8 can be considered to be approximately equivalent to the internal volume between the first control valve 6 and the orifice plate. Therefore, as will be described later, when the flow rate control is performed using the above-mentioned internal volume V, there is an advantage that an approximate internal volume V can be easily obtained with relatively high accuracy.

In the orifice built-in valve 9, any of the restriction part 2 (here, the orifice plate) and the second control valve 8 may be provided on the upstream side, but it is desirable that the volume between the restriction part 2 and the second control valve 8 (here, the space between the orifice plate and the diaphragm valve element and the seat portion of the second control valve 8) be made as small as possible. The orifice built-in valve 9 is a preferred embodiment for minimizing the above-mentioned volume.

The flow rate control device 100 described above performs the flow rate control by using the principle that the flow rate is determined by the upstream pressure P1 in the normal flow rate control mode, when the critical expansion condition $P1/P2 \geq$ about 2 (if argon gas) is satisfied. When the critical expansion condition is satisfied, the flow rate Q downstream of the restriction part 2 is given by $Q=K_1 \cdot P1$, where $K_1$ is a constant dependent on the fluid species and the fluid temperature, and the flow rate Q is proportional to the upstream pressure P1. Further, when the second pressure sensor 4 is provided, even when the difference between the upstream pressure P1 and the downstream pressure P2 is small and the above critical expansion condition is not satisfied, the flow rate can be determined by calculation based on the upstream pressure P1 and downstream pressure P2 measured by the first pressure sensor 3 and the second pressure sensor 4. The flow rate Q can be determined by $Q = K_2 \cdot P2^m (P1-P2)^n$ (where $K_2$ is a constant depending on the fluid species and fluid temperature, m and n are indexes derived from the actual flow rates).

In the normal flow rate control mode, when the set flow rate signal is sent from the external control device or the like to the control circuit 7, based on such as the output of the first pressure sensor 3, the control circuit 7 calculates the flow rate using the flow rate calculation formula under the critical expansion condition or non-critical expansion condition from the above $Q = K_1 \cdot P1$ or $Q = K_2 \cdot P2^m(P1-P2)^n$. Then, as the flow rate of the fluid passing through the restriction part 2 approaches the set flow rate (i.e., so that the difference between the calculated flow rate and the set flow rate approaches 0), the first control valve 6 is feedback-controlled. The calculated flow rate may be displayed on the display device as a control flow rate output value.

Also, when performing the flow rate rise from the state of zero flow rate to the first flow rate, which is any flow rate greater than zero, the flow rate control device 100 of the present embodiment can perform the flow rate control as described below.

Figure 2:
FIG. 2 is a diagram for explaining a flow rate control method at the time of flow rate step-down according to an embodiment of the present invention, (a) is a graph showing a set flow rate, (b) is a graph showing a controlled flow rate, (c) is a graph showing a an upstream pressure P1, (d) is a graph showing a driving voltage of the first control valve, (e) and (f) are graphs showing driving voltage of the second control valve.
Figure 2:
Figure 2:
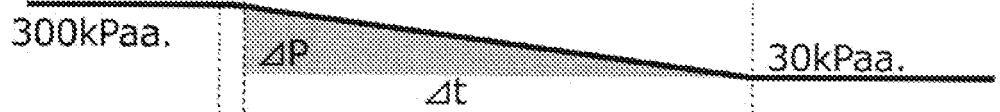
Figure 2:
Figure 2:
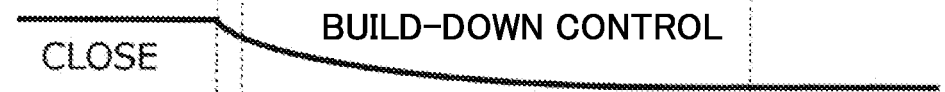
Figure 2:
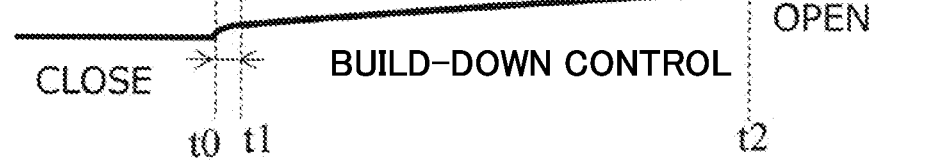

FIG. 2 is a graph showing, when performing the flow rate rise by the flow rate control method of the present embodiment, each of (a) set flow rate, (b) controlled flow rate, (c) upstream pressure P1, (d) driving voltage of the first control valve 6 (also referred to as the first valve), (e) the driving voltage of the second control valve 8 (also referred to as the second valve) when it is the normally open (NO) type, (f) the driving voltage of the second control valve 8 when it is the normally closed (NC) type.

In addition, FIG. 2 (d) shows the driving voltage when the first control valve 6 is normally closed (NC) type. On the other hand, in FIG. 2 (e) and (f) show the driving voltages when the second control valve 8 is normally open (NO) type, and when it is normally closed (NC) type. The lower the driving voltage, the smaller the valve opening degree of the first control valve 6, when the driving voltage is 0 (voltage not applied), it is completely closed (CLOSE). On the other hand, the valve opening degree of the second control valve 8 of the normally open type is smaller as the driving voltage is higher, it is fully closed (CLOSE) when the driving voltage is maximum, and fully opened (OPEN) when the driving voltage is 0 (voltage not applied). Further, the valve opening degree of the second control valve 8 of the normally closed type is smaller as the driving voltage is lower, it is completely closed (CLOSE) when the driving voltage is 0 (voltage not applied), it is fully open (OPEN) when the driving voltage is maximum.

Further, FIG. 2 shows an example in which the set flow rate rises from 0% to 10%, but the present invention is not limited thereto. However, if the target set flow rate after startup is large, the supplied pressure from the primary side after opening the first control valve 6 is higher than the remaining pressure, it is considered that the overshoot is less likely to occur. For this reason, the flow rate control method of the present embodiment is suitably used particularly when the flow rate is raised from 0% to a low set flow rate, (for example, 50% or less, typically 20% or less, and particularly about 10%).

Hereinafter, all flow rate values, such as set flow rate and target flow rate, are expressed as a ratio obtained by setting the rated flow rate value as 100%. In addition, taking into account that the flow rate and the upstream pressure P1 are proportional when the critical expansion condition is satisfied, the upstream pressure may also be expressed as a ratio, by setting the upstream pressure at the time when the flow rate value is 100% as 100% upstream pressure.

First, the first control valve 6 and the second control valve 8 are completely closed (CLOSE) when the flow rate is set to 0% and the supply of the gas is stopped. However, in the case where the gas is flowed at a desired flow rate before stopping the gas supply, the pressure remains in the flow path between the first control valve 6 and the second control valve 8 even after the first control valve 6 and the second control valve 8 are closed. In the illustrated example, the first control valve 6 and the second control valve 8 are shown in closed state after flowing gases at 100% flow rate, and the value of the upstream pressure P1 remaining even at the time of zero flow rate is 300 kPa abs in the present example, which is relatively high.

Next, at time t0 shown in FIG. 2, start raising the flow rate from the state of 0% flow rate to 10%. At this time, as shown in FIG. 2(d), the first control valve 6 is kept completely closed (CLOSE) at time t0.

On the other hand, at time t0, as shown in FIG. 2(e), 2(f), the second control valve 8 is opened and the operation of adjusting the opening degree is started.

In the state after time t0, since there is no inflow of gas from the upstream side through the first control valve 6, and the second control valve 8 is opened, the gas remaining between the first control valve 6 and the restriction part 2, and more particularly, the gas remaining between the first control valve 6 and the second control valve 8 flows out through the second control valve 8. Here, the downstream of the flow rate control device 100 is drawn into a vacuum, the downstream side is maintained in a vacuum pressure.

At this time, the remaining gas and remaining pressure, when the opening degree adjustment of the second control valve 8 is not performed, continues to exponentially fall with the outflow time, so the flow rate also falls at the same time. Therefore, in order to maintain the gas so as to flow out constantly at 10% flow rate, it is necessary to adjust the opening degree of the second control valve 8.

Therefore, in order to keep the continuous 10% flow rate, in the present embodiment, the flow rate control is switched to the build-down control mode for feedback controlling the second control valve 8, in order to match $\Delta P1/\Delta t$ to the value corresponding to the 10% setting, on the basis of the output of the first pressure sensor 3. Here, $\Delta P1/\Delta t$ is the ratio of the change $\Delta P1$ of the upstream pressure P1 output from the first pressure sensor 3, with respect to the time $\Delta t$ required for the change $\Delta P1$ of the upstream pressure P1, it is the rate of descent (hereinafter, sometimes referred to as the pressure change rate) of the upstream pressure P1 with respect to time, or it corresponds to the slope of the pressure drop.

This is, in a state where the first control valve 6 is closed, the flow rate of the gas flowing downstream of the second control valve 8 can be expressed as $Q = \alpha \cdot (\Delta P1/\Delta t) \cdot V$ (where $\alpha$ is a proportional constant, V is an internal volume between the first control valve 6 and the second control valve 8). If $\Delta P1/\Delta t$ is constant, the flow rate downstream of the second control valve 8 is also maintained constant. As described above, in the case where the second control valve 8 and the restriction part 2 are integrally provided in the form of a orifice built-in valve, the internal volume V can be regarded as substantially equal to the flow path volume from the first control valve 6 to the restriction part 2. The internal volume V can be obtained in advance from a diameter of the flow path downstream of the first control valve 6. Further, the internal volume V can also be determined by calculation from the pressure rise rate method (e.g., disclosed in Patent Document 5). In this method, from the state of maintaining the downstream side of the closed first control valve 6 in vacuum pressure, the first control valve 6 is opened while the second control valve 8 is closed. At this time, the pressure rise rate ($\Delta P1/\Delta t$) when the gas flows into the space of the volume V at a known reference flow rate is measured.

The so-called build-down method (for example, disclosed in Patent Document 6) in which the flow rate Q is obtained on the basis of the measurement result of $\Delta P1/\Delta t$, typically, is a method of obtaining the flow rate by measuring $\Delta P1/\Delta t$ of the outflow gas after closing the upstream valve while maintaining the downstream at a low pressure such as a vacuum pressure. More specifically, for example, as described in Patent Document 6, the flow rate can be obtained by $Q=(1000/760)\times 60\times(273/(2\times 73+T))\times V\times(\Delta P/\Delta t)$. Here T is the gas temperature (° C.), V is the internal volume (l), $\Delta P$ is the magnitude of the pressure drop (Torr), and $\Delta t$ is the time (sec) required for the pressure drop of $\Delta P$.

Also in the present embodiment, by obtaining $\Delta P1/\Delta t$ corresponding to the desired flow rate on the basis of the known build-down method (i.e., a target flow rate after the flow rate change, here is 10% flow rate) in order to realize the obtained $\Delta P1/\Delta t$, by feedback controlling the opening degree of the second control valve 8 on the basis of the output of the first pressure sensor 3, it is possible to continue to flow the remaining gas downstream of the second control valve 8 at a desired constant flow rate. In addition, as can be seen from the above equation, since the flow rate also varies depending on the gas temperature T, if the control of $\Delta P1/\Delta t$ is performed by the output of the temperature sensor 5 for measuring the gas temperature T, it is possible to perform the flow rate control with more improved accuracy.

When applying the build-down flow rate control described above to the second control valve 8, the controlled flow rate increases from zero while the second control valve 8 is gradually opened after the time t0, after the time t1 when $\Delta P1/\Delta t$ reaches a value corresponding to 10% flow rate, the control of maintaining $\Delta P1/\Delta t$ at a constant value is performed continuously. During this build-down flow rate control period, the first control valve 6 is maintained in a closed state, whereas the opening degree of the second control valve 8 continues to be adjusted by feedback control so as to maintain $\Delta P1/\Delta t$ at a constant value on the basis of the output of the first pressure sensor 3.

While the build-down flow rate control is continued, the remaining gas flows out at a constant flow rate with a linear decrease in the upstream pressure P1. when considering the time point when the output value of the first pressure sensor 3 decreases to the upstream pressure corresponding to 10% flow rate in the normal flow rate control mode using the first control valve 6 (here 30 kPa abs) as the time t2, in the present embodiment, the first control valve 6 is opened to the degree corresponding to 10% flow rate at time t2 (i.e., the opening degree when the pressure of the internal volume from the first control valve 6 to the restriction part 2 is controlled to 30 kPa abs). This enable the gas flowing from the upstream of the first control valve 6, to continue to flow at 10% flow rate downstream of the restriction part 2 and the second control valve 8, even after the time t2. In addition, after the time t2, the second control valve 8 is maintained in a state of being fully opened (OPEN), or is maintained in a state of being opened to an opening degree at least equal to or greater than the opening area of the restriction part 2.

As described above, in the present embodiment, the flow rate control is performed by using the second control valve 8 on the basis of the measurement of $\Delta P1/\Delta t$ (build-down flow rate control). In particular, the flow rate control is shifted to the build-down flow control mode at the time of flow rate rise up, then, operation is switched to the normal flow rate control mode of using the first control valve 6 at the time when reaching a predetermined pressure.

However, in order to perform the build-down flow rate control mode, the remaining pressure must be large to some extent. This is because when the remaining pressure is too low, $\Delta P1/\Delta t$ may not be controlled to a value corresponding to the desired flow rate. Also, when the target flow rate after raised is large, the remaining pressure may be insufficient for build-down flow rate control.

In this case, the first control valve 6 may be opened to increase the remaining pressure just before shifting to the build-down flow rate control mode. More specifically, before shifting to the build-down flow rate control mode, first, to obtain the pressure remaining downstream of the first control valve on the basis of the output of the pressure sensor 3 in a state where the first control valve 6 and the second control valve 8 are closed, and when the obtained pressure is lower than the pressure corresponding to the target flow rate, the first control valve 6 is opened until the pressure remaining downstream of the first control valve 6 becomes higher than the pressure corresponding to the target flow rate. Then, at the time when the output of the pressure sensor 3 exceeds the pressure corresponding to the target flow rate, the first control valve 6 is closed where sufficient remaining pressure can be obtained before shifting to the build-down flow rate control mode.

In the case where the remaining pressure is low or the target flow rate after the startup is large as described above, it is considered that overshoot at the time of valve opening due to the remaining pressure is unlikely to occur. Therefore, the threshold value of the remaining pressure or the threshold value the target flow rate for shifting to the build-down flow rate control mode may be set in advance, if the threshold value is not reached, instead of shifting to the build-down flow rate control mode, it may shift to the normal flow rate control mode, i.e., the flow control mode of adjusting the opening degree of the first control valve 6 on the basis of the output of the pressure sensor 3. At this time, the second control valve 8 may be controlled to be fully opened in conjunction with the opening operation of the first control valve 6, or to be an opening degree equal to or greater than the opening area of the restriction part 2.

In another embodiment of the present invention, the operation of quickly opening the second control valve 8 to a predetermined opening degree may be performed before shifting to the build-down flow rate control mode. In this case, a table, in which the remaining pressure, the target flow rate, and the valve opening degree are associated with each other, may be stored in advance in a storage device or the like, and the second control valve 8 may be controlled using this table. In the case of using the table, first, the opening degree of the second control valve 8 is brought close to the vicinity of the opening degree following the table, then feedback control may be performed to keep $\Delta P1/\Delta t$ at constant on the basis of the output from the pressure sensor 3.

As items stored in the above table, a plurality of parameters such as gas species, a remaining pressure, controlled flow rate, and the like are considered. In this case, a table corresponding to each parameter may be prepared, but a reference table may be prepared, and, for example, when the gas species are different, a correction coefficient corresponding to the gas specie may be provided to cover the difference of the gas species, and the reference table may be corrected and used. Alternatively, even when the reference table is used without correction, since the second control valve 8 can be brought close to the desired opening degree to some extent, the control load can be reduced while improving the responsiveness of the second control valve 8.

According to the flow rate control method of the present embodiment described above, as shown in FIG. 2(*b*), the controlled flow rate can be rapidly raised up in a short time period from t0 to t1 (e.g., 0.1 seconds). In addition, excess pressure is less likely to occur when rising up to a low set flow rate since the gas can be flowed by utilizing the remaining pressure while the first control valve 6 is kept closed, and it is possible to prevent the overshooting. In addition, by adjusting the opening degree of the second control valve 8, it is possible to continue to flow the gas stably at the flow rate after the startup, and further, after the remaining gas decreases to a predetermined pressure, it is possible to continue to flow the gas at a desired flow rate by opening the first control valve 6.

Hereinafter, an exemplary flow chart of the flow rate control method of the present embodiment will be described with reference to FIG. 3. In this flowchart, it is assumed that the build-down flow rate control mode is executed.

Figure 3:
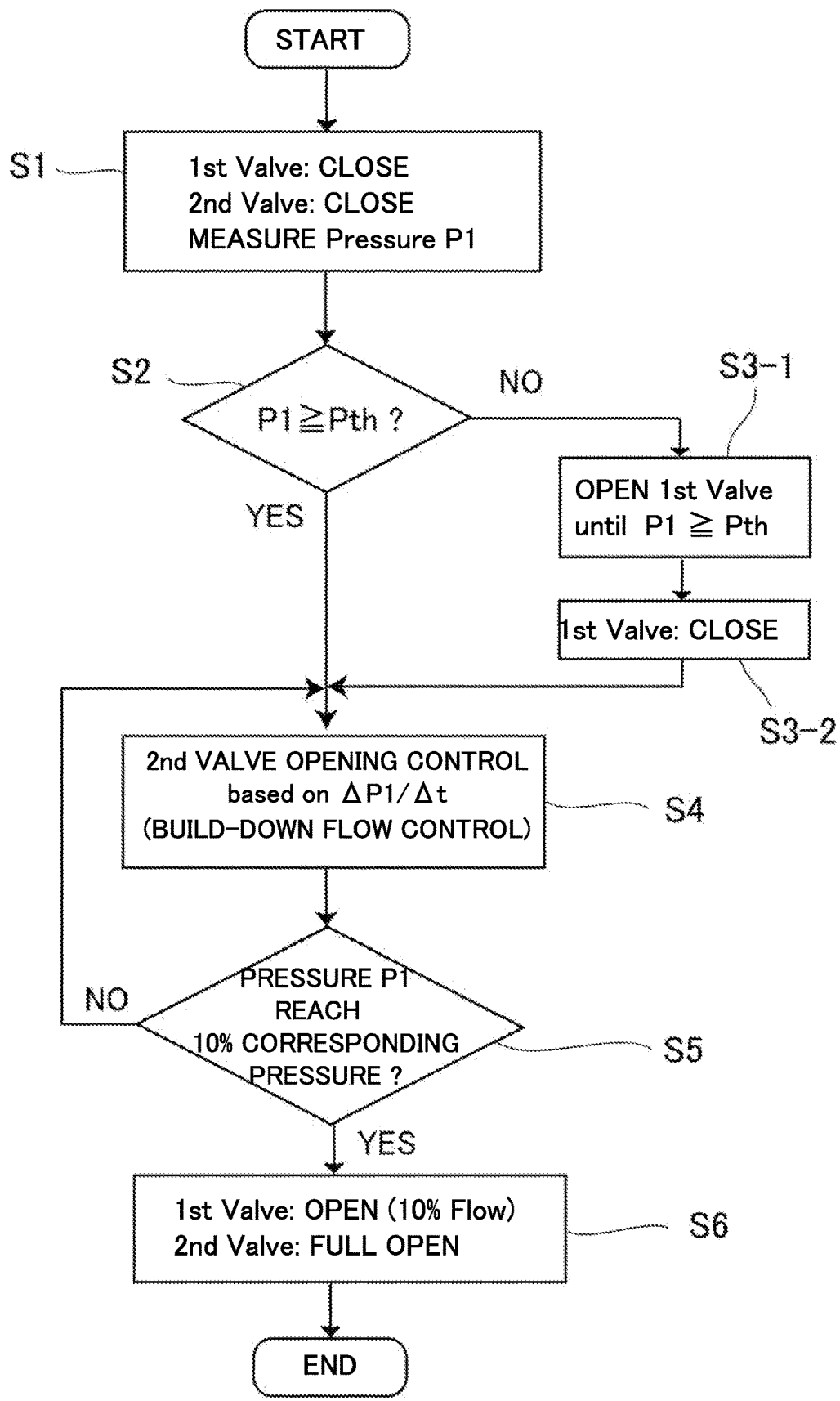
FIG. 3 is a flowchart showing the flow rate control method according to an embodiment of the present invention.

As shown in step S1 in FIG. 3, at 0% setting in a state where the first control valve 6 (first valve) and the second control valve 8 (second valve) are closed, the upstream pressure P1 or remaining pressure is measured by the pressure sensor 3.

Next, as shown in step S2, it is determined whether or not the measured upstream pressure P1 is equal to or greater than a threshold value Pth. When the upstream pressure P1 is equal to or higher than the threshold value Pth (YES), the process shifts to the build-down flow rate control mode of step S4. On the other hand, when the upstream pressure P1 is less than the threshold value (NO), the operation of opening the first control valve 6 is performed until the upstream pressure P1 becomes equal to or higher than the threshold value as in the step S3-1, and thereafter, the first control valve 6 is closed as in the step S3-2.

In another embodiment, in step S2, if the measured upstream pressure P1 is less than the threshold Pth, instead of shifting to the build-down flow control mode, as shown in step S6, it may be directly transferred to the normal flow rate control mode of controlling the opening degree of the first control valve 6 on the basis of the output of the pressure sensor.

If the upstream pressure P1 is large enough, the operation of shifting to the build-down flow rate control mode and rising the flow rate from 0% to 10% is performed. Specifically, while continuing closing of the first control valve 6, the second control valve 8 is opened. The flow rate control according to $Q=\alpha \cdot (\Delta P1/\Delta t) \cdot V$, where V is the flow path volume between the first control valve 6 and the second control valve 8 (or restriction part 2), or the control of adjusting the opening degree of the second control valve 8 on the basis of the output of the pressure sensor 3 so as to maintain the $\Delta P1/\Delta t$ at a predetermined value (a value corresponding to 10% flow rate) as shown in step S4 is performed.

Further, as shown in step S5, by monitoring the output of the first pressure sensor 3, it is determined whether or not the upstream pressure P1 output from the first pressure sensor 3 has reached to a predetermined value, more specifically, the predetermined value corresponding to 10% flow rate in the flow rate control according to $Q=K1 \cdot P1$. If it is determined that the predetermined value has not been reached (NO), the process returns to step S4 to continue the control of the opening degree of the second control valve 8 and to continue the build-down control mode of flowing the gas at the flow rate of 10%.

In step S5, when it is determined that the output of the first pressure sensor 3 has reached the predetermined value (YES), switching of control is performed, and as shown in step S6, while opening the first control valve 6 to an opening degree corresponding to the 10% flow rate, open the second control valve 8 to fully open or to the opening degree that is equal to or greater than the opening degree of the restriction part 2. Thus, it switches to the normal flow control mode. Thereafter, the first control valve 6 is feedback controlled on the basis of the output of the first pressure sensor 3, it is possible to continue to flow the gas at 10% flow rate by the flow rate control based on $Q=K1 \cdot P1$.

While embodiments of the present invention have been described above, various modifications are possible. For example, although the embodiment of maintaining the first control valve 6 in the closed state after the start of the flow rate rise has been described above, the present invention is not limited thereto. In the build-down flow rate control mode after the start of the flow rate rise, the first control valve 6 is opened to a certain opening degree smaller than the opening degree corresponding to the target flow rate (e.g., the opening degree corresponding to 5% set flow rate), the state of flowing gas at a flow rate less than the target flow rate may be continued. Also in this case, based on the output of the first pressure sensor 3, if the opening degree of the second control valve 8 is adjusted so as to maintain the $\Delta P1/\Delta t$ at a predetermined value, fluid can be flowed at a target flow rate downstream of the second control valve 8. Further, if the first control valve 6 is also slightly opened during build-down flow rate control, the first control valve 6 can be opened more quickly to the desired opening degree when switching to the normal flow control mode at time t2, the stability of the flow rate control can be improved.

However, since the flow rate equation used in the build-down method typically is a formula assuming that the upstream valve (first control valve 6) is closed, in a state where the upstream side is open, and the fluid is flowing to the volume V portion, if using the flow equation as it is, the flow rate control may not be performed properly. However, if the flow rate from the upstream side into the volume V is known, it is conceivable that the flow rate equation can be corrected and used. Therefore, when the inflow amount is known, it can be regarded as the same situation that substantially the same when the upstream valve is closed.

Further, in the above description, the embodiment in which the upstream pressure P1 is measured in a state where both the first control valve 6 and the second control valve 8 are closed in step S1 at the time of flow rate rise has been described, but the present invention is not limited thereto. When the flow rate immediately before the flow rate startup is zero, he second control valve 8 may be closed, the first control valve 6 is closed to an opening degree smaller than the opening degree when the opening degree of the first control valve 6 is controlled based on the output of the pressure sensor 3 so as to be the first flow rate, or it also may be in a slightly open state. In this case, since the second control valve 8 is closed while the first control valve 6 is open, the measured pressure of the pressure sensor 3 is increased, but when the first measurement pressure is equal to or greater than the threshold value, or when the increased measurement pressure reaches equal to or greater than the threshold value, the second control valve 8 may be opened, and performance of the above build-down flow rate control may be operated. Further, the slightly opened state of the first control valve 6 as described above may be continued as it is during the build-down flow rate control.

Further, even though an example of setting the set flow rate as 100% at the time when both the first control valve 6 and the second control valve 8 are fully opened has been described above, it is not necessary to be so, it is also possible to set the certain opening degree, but not fully opened, as 100%. In the above embodiment, the upstream pressure P1 at the set flow rate of 100% is 300 kPa abs, and the upstream pressure P1 at the set flow rate of 10% is 30 kPa abs, but the present invention is not limited thereto, it is needless to say that the upstream pressure P1 may be various values depending on the set flow rate, the flow rate range, the fluid species, and the like.

INDUSTRIAL APPLICABILITY

The flow rate control method and the flow rate control device according to the embodiments of the present invention may be suitably used when supplying a material gas or the like in a semiconductor manufacturing process, in particular, when performing rise up from zero flow rate.

DESCRIPTION OF NUMERICAL

1 Flow path
2 Restriction part
3 First pressure sensor
4 Second pressure sensor
5 Temperature sensor
6 First control valve
7 Control circuit
8 Second control valve
9 Valve with built-in orifice
100 Flow rate control device

The invention claimed is:

1. A flow rate control method for raising a flow rate from zero to a first flow rate in a flow rate control device including:
   a first control valve provided in a flow path;
   a second control valve provided downstream of the first control valve; and
   a pressure sensor for measuring a fluid pressure downstream of the first control valve and upstream of the second control valve,
   the flow rate control method comprising:
   (a) a step of obtaining a pressure remaining downstream of the first control valve on the basis of an output of the pressure sensor, in a state where the second control valve is closed; and
   (b) a step of controlling the pressure remaining downstream of the first control valve by adjusting an opening degree of the second control valve on the basis of the output of the pressure sensor, and flowing a fluid at the first flow rate downstream of the second control valve,
   wherein, in the step (b), the opening degree of the second control valve is controlled on the basis of a signal output from the pressure sensor, so as to match a build-down flow rate Q represented by:

$$Q = \alpha \cdot (\Delta P1/\Delta t) \cdot V$$

to the first flow rate, where $\alpha$ is the proportional constant, $\Delta P1/\Delta t$ is a pressure change rate of the upstream pressure change $\Delta P1$ from the pressure sensor with respect to the time $\Delta t$ required for the upstream pressure change $\Delta P1$, and V is an internal volume between the first control valve and the second control valve.

2. The flow rate control method according to claim 1, wherein, in step (a), the remaining pressure is obtained in a state where both the first control valve and the second control valve are closed.

3. The flow rate control method according to claim 2, further comprising a step of opening the first control valve until the pressure remaining downstream of the control valve becomes higher than the pressure corresponding to the first flow rate when the pressure obtained on the basis of the output of the pressure sensor is lower than the pressure corresponding to the first flow rate in the step (a), and closing the first control valve at the time when it exceeds the pressure corresponding to the first flow rate.

4. The flow rate control method according to claim 1, wherein in the step (a), the first control valve is opened to a degree smaller than the opening degree when controlling so as that the opening degree of the first control valve becomes the first flow rate, based on the output of the pressure sensor, when the pressure obtained on the basis of the output from the pressure sensor is equal to or greater than a threshold value, the step (b) is performed after opening the second control valve.

5. The flow rate control method according to claim 1, further comprising a step (c) of controlling the opening degree of the first control valve on the basis of the output from the pressure sensor to flow a fluid downstream at the first flow rate, when the output of the pressure sensor drops to a predetermined value, after performing the step (b).

6. A flow rate control device comprising:
   a first control valve provided in a flow path;
   a second control valve provided downstream of the first control valve;
   a pressure sensor for measuring a fluid pressure downstream of the first control valve and upstream of the second control valve; and
   a control circuit for controlling the operation of the first control valve and the second control valve, the control circuit being configured to control the flow rate by controlling the first control valve and the second control valve on the basis of a signal output from the pressure sensor,
   wherein when the flow rate control device raises a flow rate from zero to a first flow rate, the control circuit performs:
   (a) a step of obtaining a pressure remaining downstream of the first control valve on the basis of an output of the pressure sensor, in a state where the second control valve is closed; and
   (b) a step of controlling the pressure remaining downstream of the first control valve by adjusting the opening degree of the second control valve on the basis of the output of the pressure sensor, and flowing a fluid at the first flow rate downstream of the second control valve,
   wherein, in the step (b), the opening degree of the second control valve is controlled on the basis of a signal output from the pressure sensor, so as to match a build-down flow rate Q represented by:

$Q = \alpha \cdot (\Delta P1/\Delta t) \cdot V$ to the first flow rate, where $\alpha$ is the proportional constant, $\Delta P1/\Delta t$ is a pressure change rate of the upstream pressure change $\Delta P1$ from the pressure sensor with respect to the time Δt required for the upstream pressure change ΔP1, and V is an internal volume between the first control valve and the second control valve.

7. The flow rate control device according to claim 6, further comprising another pressure sensor provided downstream of the second control valve.

8. A flow rate control device comprising:
a first control valve provided in a flow path;
a second control valve provided downstream of the first control valve; and
a pressure sensor for measuring a fluid pressure downstream of the first control valve and upstream of the second control valve,
the flow rate control device being configured to control a downstream flow rate on the basis of a signal output from the pressure sensor,
wherein when controlling the flow rate from zero flow rate to the first flow rate, from the zero flow rate after closing the second control valve, the opening degree of the second control valve is controlled on the basis of an output of the pressure sensor, so that a rate of a pressure change remaining downstream of the first control valve coincides with a rate of a pressure change when the flow rate of a fluid flowing out from the second control valve becomes the first flow rate,
wherein the opening degree of the second control valve is feedback controlled on the basis of a signal output from the pressure sensor, so that a build-down flow rate Q represented by
$Q=\alpha \cdot (\Delta P1/\Delta t) \cdot V$ matches to the first flow rate, where α is a proportional constant, ΔP1/Δt is a pressure change rate of the upstream pressure change ΔP1 from the pressure sensor, with respect to the time Δt required for the upstream pressure change ΔP1, V is an internal volume between the first control valve and the second control valve.

9. The flow rate control device according to claim 8, wherein the first control valve is closed when controlling the flow rate from zero flow state to the first flow rate.

10. The flow control device according to claim 8, wherein the first control valve is controlled to an opening degree smaller than an opening degree corresponding to a first flow rate, when controlling the flow rate from the state of zero flow rate to the first flow rate.

11. The flow rate control device according to claim 8, further comprising another pressure sensor provided downstream of the second control valve.

12. A flow rate control device comprising:
a first control valve provided in a flow path;
a second control valve provided downstream of the first control valve; and
a first pressure sensor for measuring an upstream pressure which is a fluid pressure downstream of the first control valve and upstream of the second control valve,
the flow rate control device being configured to control a downstream flow rate on the basis of a signal output from the first pressure sensor, wherein:
when controlling the flow rate from zero flow rate zero to a first flow rate, using a pressure remaining downstream of the first control valve,
the flow rate is controlled by $Q=\alpha \cdot (\Delta P1/\Delta t) \cdot V$,
when the pressure of the first pressure sensor reaches a predetermined pressure,
the flow rate is switched to a control by $Q=K1 \cdot P1$, where Q is the flow rate, α is a proportional constant, ΔP1/Δt is the pressure change rate of the upstream pressure, and V is the inner volume between the first control valve and the second control valve, K1 is a constant depending on a fluid species and a fluid temperature, P1 is the upstream pressure output from the first pressure sensor.

13. The flow rate control device according to claim 12, wherein the control is switched when the pressure of the first pressure sensor reaches the pressure corresponding to the first flow rate in the control by $Q=K1 \cdot P1$.

14. A flow rate control device comprising:
a first control valve provided in a flow path;
a second control valve provided downstream of the first control valve;
a first pressure sensor for measuring an upstream pressure which is the fluid pressure downstream side of the first control valve and upstream of the second control valve; and
a second pressure sensor for measuring a downstream pressure which is the fluid pressure downstream of the second control valve,
the flow rate control device being configured to control a downstream flow rate based on signals output from the first pressure sensor and the second pressure sensor, wherein:
when controlling the flow rate from zero flow rate to the first flow rate, using the pressure remaining downstream of the first control valve, the flow rate is controlled by $Q=\alpha \cdot (\Delta P1/\Delta t) \cdot V$;

when the pressures based on the first pressure sensor and the second pressure sensor reach to a predetermined pressures, the control is switched to a control by $Q=K_2 \cdot P2^m (P1-P2)^n$ where Q is the flow rate, α is a proportional constant, ΔP1/Δt is a pressure change rate of the upstream pressure from the first pressure sensor, V is an internal volume between the first control valve and the second control valve, $K_2$ is a constant depending on a fluid species and a fluid temperature, P1 is the upstream pressure, P2 is the downstream pressure output from the second pressure sensor, m and n are indexes derived from actual flow rates.

15. The flow rate control device according to claim 14, wherein the control is switched when the pressures of the first and second pressure sensors reach to the pressures corresponding to the first flow rate in the control by $Q=K_2 \cdot P2^m (P1-P2)^n$.

* * * * *